Figure 1:
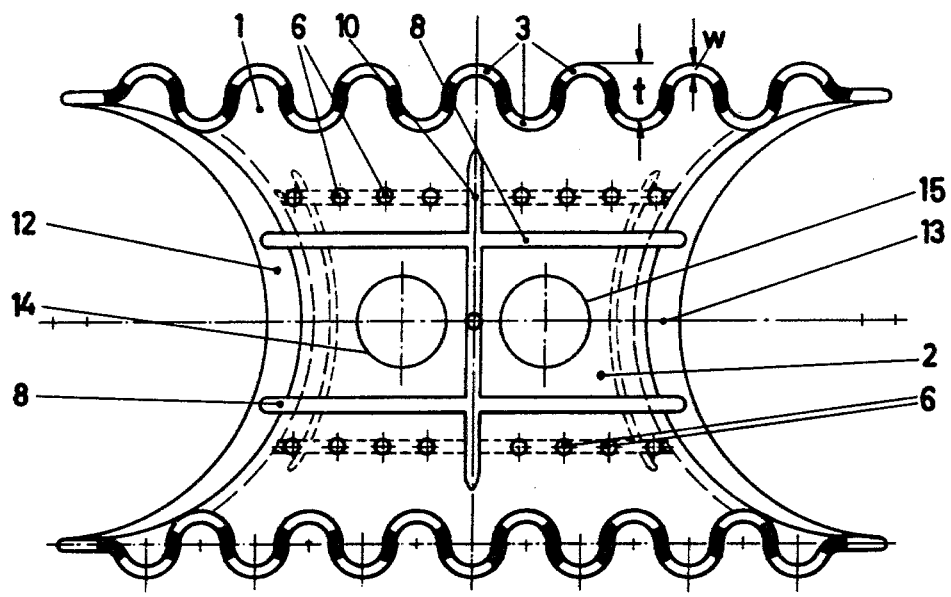

United States Patent [19]

Braun

[11] 4,256,673

[45] Mar. 17, 1981

[54] PACKING ELEMENT FOR USE IN PACKED COLUMNS

[75] Inventor: Roland Braun, Ludwigshafen-Rheingönhelm, Fed. Rep. of Germany

[73] Assignee: Raschig GmbH, Ludwigshafen am Rhein, Fed. Rep. of Germany

[21] Appl. No.: 42,234

[22] Filed: May 24, 1979

[30] Foreign Application Priority Data

Jun. 3, 1978 [DE] Fed. Rep. of Germany ....... 2824455

[51] Int. Cl.³ .............................................. B01F 3/04
[52] U.S. Cl. ........................................ 261/94; 261/98; 261/DIG. 72
[58] Field of Search .................................. 261/94–98, 261/DIG. 72; 210/150, 151; 422/310, 311

[56] References Cited

U.S. PATENT DOCUMENTS

| 3,956,128 | 5/1976 | Turner | 261/DIG. 72 |
| 4,086,307 | 4/1978 | Glaspie | 261/DIG. 72 |

FOREIGN PATENT DOCUMENTS

| 1262970 | 6/1968 | Fed. Rep. of Germany . | |
| 1945048 | 3/1971 | Fed. Rep. of Germany ... | 261/DIG. 72 |
| 2158645 | 5/1973 | Fed. Rep. of Germany . | |
| 1769581 | 8/1977 | Fed. Rep. of Germany . | |

OTHER PUBLICATIONS

Norton, "Super Intalox Tower Packing," Norton Co., Akron, Ohio, pp. 1, 2, 6-9, copyright, 1973.

*Primary Examiner*—Richard L. Chiesa
*Attorney, Agent, or Firm*—Balogh, Osann, Kramer, Dvorak, Genova & Traub

[57] ABSTRACT

The packing is U-shaped in cross-section and comprises a double-curved bight portion which is arcuate in longitudinal section and in cross-section. Two transversely spaced apart, corrugated side wall portions extend along and merge into said bight portion on one side thereof and are formed with corrugations which extend in their longitudinal direction to and merge into said bight portion and have a crest-to-trough height in excess of the wall thickness of said side wall portions. The bight portion is concave in cross-section on the side on which said side wall portions are disposed and is concave in longitudinal section on the opposite side.

12 Claims, 4 Drawing Figures

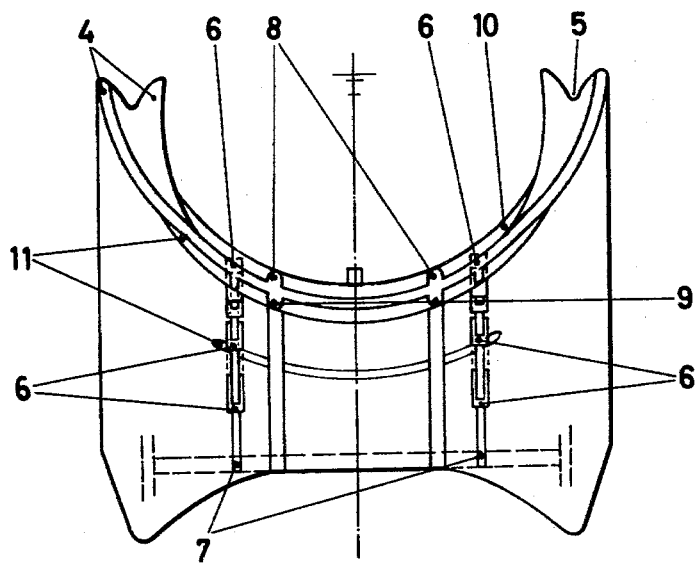
Fig. 4  A-A

PACKING ELEMENT FOR USE IN PACKED COLUMNS

This invention relates to a curved packing element which is used in packed columns and consists of plastic material. The packing element is saddle-shaped or part-toroidal and has an arcuate configuration in cross-section and comprises raised side walls which terminate, if desired in toothed edges.

Saddle-shaped or part-toroidal packing elements are being used widely mainly in chemical technology. Such packing elements of plastic material have the disadvantage that they are only poorly wetted by the aqueous liquids which are mostly used. It has been attempted to eliminate or mitigate said disadvantage by the provision of toothed edges, which result in a larger number of drip-off points. This is shown, e.g., in German patent publication No. 1,262,970. Opened German Specification No. 2,158,645 discloses ceramic saddles which have widened depressions between the teeth in order to provide more drip-off points. These proposals do not produce satisfactory results in plastic packing elements because the liquid tends to flow over the surface of the packing elements in streams so that a large portion of the surface remains unwetted.

For this reason, saddle-shaped or part-toroidal packing elements have been provided on their side faces with ribs which begin close to the notches between the teeth at the side edges and extend inwardly toward the central axis of the toroid, as shown in German patent specification No. 1,769,581. These ribs served to divide the streams of liquid so that the wetting of such plastic packing elements was improved. The height of said ribs was approximately as large as the wall thickness of the saddles and only slightly exceeded 1 mm although ribs in that height cannot adequately guide the stream of liquid.

It is an object of the invention to provide a packing element which promotes an improved transfer and a good wetting, also to promote an additional deflection of the gas stream and a production of turbulence therein, and to avoid a loss of transfer surface area due to a contact between side faces of adjacent saddles. These objects cannot be accomplished by the provisions of the conventional ribs.

In accordance with the invention the object set forth is accomplished in that the side wall portions of the packing element are formed with corrugations which have a crest-to-trough height in excess of the wall thickness of the packing element and which have a pitch which preferably exceeds twice said wall thickness. At the side edges of the packing element, the crests and troughs formed by the corrugations terminate in scallops, which form drip-off edges. These high corrugations are at least approximately parallel and merge into a curved bight portion of the packing element. In a packed column in which the packing elements are arranged at random, the corrugations increase the length of the paths flown by the gas and liquid so that the transfer effect will be improved.

The design according to the invention provides a fully effective additional transfer surface area and does not involve an additional expenditure of "dead" material, which would not contribute to the process. Besides, that design results in a desirable additional turbulence of the gas and liquid. The corrugations serve to stiffen the side wall portions of the saddle so that its mechanical strength is increased. For this reason the packing element can be made in a relatively small wall thickness. By the provision of the conventiional ribs it has not been possible to adequately prevent loss of transfer surface area due to a contact between parallel juxtaposed packing elements. Such loss of transfer surface area is precluded by the design according to the invention. Additional drip-off means are provided in the form of drip-off bosses, which are preferably formed integrally with longitudinal ribs and are provided on the curved bight portion adjacent to the fingerlike corrugations. All these measures substantially contribute to an increase in efficiency.

An embodiment of a saddle-shaped packing element according to the invention is shown by way of example on the drawings to an enlarged scale.

Figure 2:
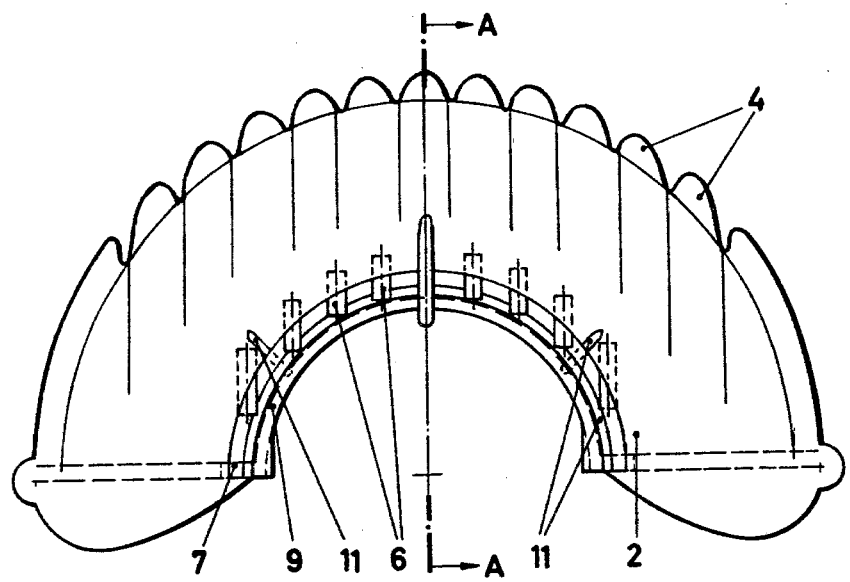
Figure 3:
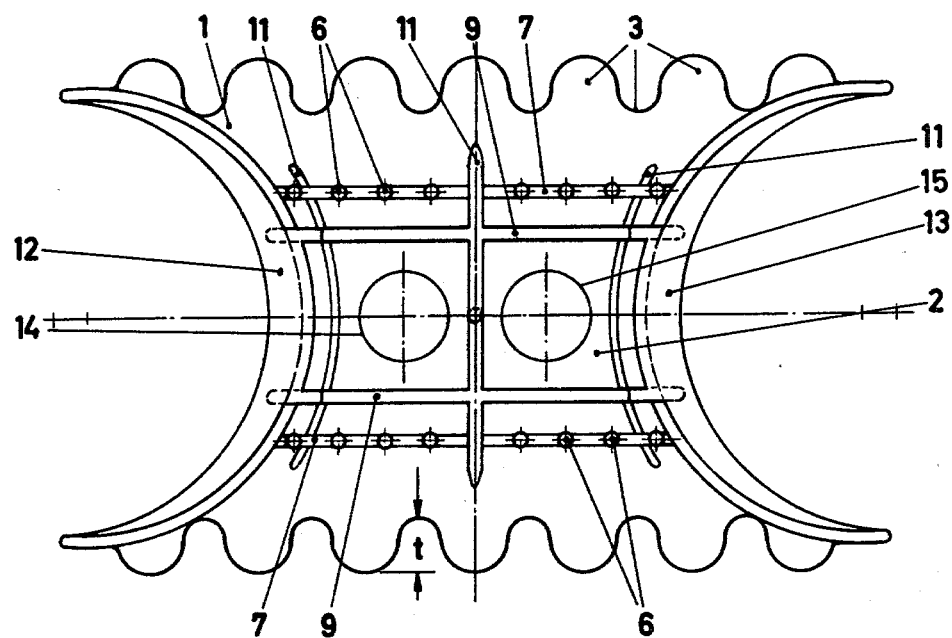

FIG. 1 is a top plan view showing a saddle-shaped packing element,

FIG. 2 a side elevation showing that saddle-shaped packing element,

FIG. 3 a bottom view of the saddle-shaped packing element and

FIG. 4 a sectional view taken on line A—A in FIG. 2.

In the embodiment shown by way of example, the saddle-shaped packing element constitutes part of the radially inner annular portion of a hollow toroid. The packing element consists of plastic material and is U-shaped in cross-section. It comprises a double-curved bight portion 2, which is arcuate in longitudinal section and in cross-section. Two transversely spaced apart, corrugated side wall portions 1 extend along and merge into the bight portion 2 on the side thereof which is opposite to the central axis of the toroid. The side wall portions 1 are formed with corrugations 3, which are at least approximately parallel and extend in their longitudinal direction to and merge into the bight portion 2. The corrugations 3 extend in a transverse direction to the side wall portions 1. The bight portion 2 is concave in cross-section on the side on which the side wall portions are disposed, i.e., on the side remote from the central axis of the toroid, and is concave in longitudinal section on the opposite side, which faces said central axis. The side wall portions 1 have side edges opposite to the bight portion. The corrugations 3 comprise crests and troughs which terminate at said side edges in the form of projecting scallops 4. The crest-to-trough height t of the corrugations 3 exceeds the wall thickness W of the side wall portions 1 and may exceed the wall thickness of any part of the packing element. The pitch of the corrugations 3 exceeds twice the wall thickness W of the side wall portions 1. When a large number of packing elements are arranged at random in a packed column, the packing elements owing to their specific surface configuration will influence the directions of flow paths of the gas and liquid will be increased and the contact between the phases will be improved and their turbulence will be increased.

The side edges of the side wall portions 1 are provided with notches 5 between the scallops 4.

Adjacent to the corrugations 3, the bight portion 2 is integrally formed with drip-off bosses 6. On the side opposite to the side wall portions 1, theses bosses 6 are preferably connected by longitudinal ribs 7. The scallops 4 formed by the corrugations 3 at the side edges, the notches 5, and the integrally formed drip-off bosses 6 promote a satisfactory dripping of liquid from the packing element so that the interfaces will be continuously renewed and the transfer effect will be increased. Owing to the corrugations 3 of the side wall portions 1, to longitudinal ribs 8 and 9 on the inside and outside, respectively, of the bight portion 2, and to transverse ribs 10 and 11 on the inside and outside, respectively, of the bight portion 2, the packing element will have an excellent stiffness even if its wall thickness is relatively small. The stiffness is also improved by ribs 12 and 13 at opposite ends of the packing element. Fluid flow through the saddle-shaped packing element is made possible by apertures 14 and 15 in the bight portion 2.

What is claimed is:

1. A packing element for use in a packed column,
    said packing element being U-shaped in cross-section and comprising
    a double-curved bight portion which is arcuate in longitudinal section and in cross-section, and
    two transversely spaced apart, corrugated side wall portions extending along and merging into said bight portion on one side thereof and formed with corrugations having crests and troughs which terminate at said side wall portions, said corrugations extend in a transverse direction to said side wall portions, and said corrugations extend in their longitudinal direction to and merge into said bight portion and have a crest-to-trough height in excess of the wall thickness of any part of said packing element,
    said side wall portions having side edges opposite to said bight portion and said crests and troughs of said corrugations terminating in the form of projecting scallops at said side edges,
    said bight portion being concave in cross-section on the side on which said side wall portions are disposed and being concave in longitudinal section on the opposite side, and said side edges being notched between said scallops.

2. A packing element as set forth in claim 1, which is saddle-shaped.

3. A packing element as set forth in claim 1, which has the shape of part of a radially inner annular portion of a hollow toroid.

4. A packing element as set forth in claim 1, which consists of plastic material.

5. A packing element as set forth in claim 1, in which the pitch of said corrugations exceeds twice the wall thickness of said side wall portions.

6. A packing element as set forth in claim 1, in which said corrugations are at least approximately parallel.

7. A packing element as set forth in claim 1, in which said bight portion is formed with bosses adjacent to said corrugations, so as to promote a satisfactory dripping of liquid from the packing element.

8. A packing element as set forth in claim 7, in which said bight portion is formed with two ribs, which extend along and adjacent to respective ones of said corrugated portions, and
    said bosses are integrally formed with said ribs.

9. A packing element as set forth in claim 1, in which said bight portion is formed adjacent to said corrugations with bosses on the side opposite to said side wall portions and is formed with ribs, which extend along said side wall portions between and connect adjacent ones of said bosses.

10. A packing element as set forth in claim 1, in which said bight portions is formed with longitudinal stiffening ribs, which extend along said side wall portions, and with transverse stiffening ribs, which extend transversely to said side wall portions.

11. A packing element as set forth in claim 10, in which
    said bight portion is formed adjacent to said corrugations with bosses and with additional ribs which extend along said side wall portions and adjoin said bosses.

12. A packing element as set forth in claim 1, in which said each of said side wall portions is generally concavely curved in cross-section on the side facing the other side wall portion.

* * * * *